United States Patent [19]

Sudre

[11] 4,156,679

[45] May 29, 1979

[54] IGNITION-RETARDING ADJUVANT FOR POLYVINYL CHLORIDE

[75] Inventor: Alain Sudre, Les Andelys, France

[73] Assignee: Armosig S.A., La Celle St Cloud, France

[21] Appl. No.: 871,948

[22] Filed: Jan. 24, 1978

[30] Foreign Application Priority Data

Jan. 26, 1977 [FR] France ................................ 77 02098

[51] Int. Cl.$^2$ .......................... C08K 3/38; C08K 3/26; C08K 3/24
[52] U.S. Cl. .......................... 260/45.75 R; 260/42.49; 260/45.7 R; 260/45.75 C; 260/45.75 W; 260/45.75 P
[58] Field of Search ...................... 252/8.1; 260/42.49, 260/45.75 C, 45.75 W, 45.75 P, 45.7 R, 2.5 H, 2.5 FP, 45.75 R

[56] References Cited

U.S. PATENT DOCUMENTS

| | | | |
|---|---|---|---|
| 3,819,577 | 6/1974 | McRowe | 260/45.75 C |
| 3,822,234 | 7/1974 | McRowe | 260/45.75 P |
| 3,933,742 | 1/1976 | Dickens | 260/45.75 W |
| 3,957,723 | 5/1976 | Lawson et al. | 260/45.75 W |
| 3,965,068 | 6/1976 | Dickens | 260/45.75 W |
| 3,985,706 | 10/1976 | Kay | 260/42.49 |
| 3,993,607 | 11/1976 | Florence | 260/45.75 P |

FOREIGN PATENT DOCUMENTS 2236893 2/1975 France.

OTHER PUBLICATIONS

Kunstoffe, 67 (1977) 1, pp. 34/38, as Translated in German Plastics.
SPE Journal — vol. 28, No. 7, Jul. 1972, Article by Charles A. Clark.

*Primary Examiner*—V. P. Hoke
*Attorney, Agent, or Firm*—Charles E. Brown

[57] ABSTRACT

An ignition-retarding adjuvant for rigid or unplasticized polyvinyl chloride comprising a compound capable of assisting kinetic control of the evolution of hydrochloric acid and a catalytic composition of salts of at least one transition metal capable of reducing the conversion to benzene and other aromatic compounds inherent in any pyrolytic degradation of polyvinyl chloride.

11 Claims, No Drawings

IGNITION-RETARDING ADJUVANT FOR POLYVINYL CHLORIDE

The present invention relates to the flameproofing of rigid or unplasticized polyvinyl chloride, in which the content of lubricant and plasticizer is relatively low and is in practice just sufficient to allow the material to be moulded. Such resins based on rigid polyvinyl chloride are used, for example, for the manufacture of pipelines and various channelling.

In general terms, resins based on polyvinyl chloride can be considered as being of low flammability; if they are subjected to a pyrolysis and the source of heat responsible for the pyrolysis is stopped, their flames go out.

However, and especially in the case of a sustained fire, polyvinyl chloride undergoes, from temperatures of about 200° C. upwards, a process of decomposition leading to the evolution of products such as benzene and higher aromatic hydrocarbons which are prone to ignite and to continue to burn as long as the heat energy applied to them is sufficient.

In order to improve the flameproofing properties of the resins based on polyvinyl chloride it has already been proposed to add thereto products which are able, in the case of a pyrolysis, to develop a chemical reaction, in the resin, with the decomposition products resulting from such a pyrolysis, and to form, under these conditions, products which are difficult, or more difficult, to ignite.

Thus, for example, it has been proposed in the U.S. application of Daniel M. Florence, Ser. No. 312,740, filed Dec. 6, 1972, now abandoned, (French Pat. No. 2.209.793); to use, for this purpose, metal oxides, and especially ferric oxide, such metal oxides being of a type which increases the carbonaceous residue and hence reduces the extent of the fumes produced with, furthermore, a certain delay in the appearance of such fumes. However, the amount of oxide to be employed is large, being at least 0.5 part by weight, and in practice at least 5 parts by weight, per 100 parts by weight of resin.

Such a technique, which can prove satisfactory with resins based on plasticised polyvinyl chloride, has however limits depending on the base composition of the resin, and in particular cannot be employed with resins based on rigid polyvinyl chloride, for which the proportion in which such oxides must be employed is incompatible with continuous production since, as is known, resins based on rigid polyvinyl chloride only tolerate a relatively low proportion of fillers.

It has also been proposed in West German Pat. No. 1,176,845 to add ferrocene (iron dicyclopentadienyl) to resins based on polyvinyl chloride in order to flameproof them. Apart from the fact that the results obtained in this case, while still require that a relatively high proportion of the flameproofing adjuvant, of the order of 0.1 to 5% by weight, should be used, are generally not considered to be adequate, this flameproofing adjuvant also promotes the photodegradation of the polyvinyl chloride to which it is added, which in practice considerably limits the subsequent possibilities of using the finished material obtained under these conditions.

It has also been proposed in Dickens, Jr., U.S. Pat. No. 3,968,081, granted July 6, 1976 to flameproof resins based on polyvinyl chloride by employing organic derivatives of heavy metals, that is to say transition metals of sub-groups VI to VIII of the periodic classification, such as iron, cobalt, nickel or manganese. However, here again the proportions of such derivatives which have to be introduced to achieve satisfactory results are high and lead to high costs.

These various previously known techniques thus have in common the need to use not insignificant amounts of various products, of the order of a few % by weight of the total, which illustrates that these products act through their intrinsic flameproofing properties and that they simultaneously lead, firstly, to a serious increase in the cost of manufacture of the finished product obtained, and, secondly, to a premature deterioration of the mechanical properties of these materials.

In contrast, the object of the present invention is, in general terms, to provide finished materials based on rigid polyvinyl chloride to which has been added an ignition-retarding adjuvant in a sufficiently limited proportion to have virtually no effect on the physical, electrical and mechanical properties of such a material and so as not significantly to affect the manufacturing cost of the material.

More precisely, the object of the present invention is, first of all, an ignition-retarding adjuvant for resins based on rigid polyvinyl chloride, comprising, in association, a compound capable of assisting kinetic control of the evolution of hydrochloric acid, and a catalytic composition of salts of at least one transition metal capable of reducing the conversion to benzene and other aromatic compounds inherent in any pyrolytic degradation of polyvinyl chloride.

The invention also provides rigid or unplasticised polyvinyl chloride containing, in addition to possible stabilisers, lubricants, colorants and other fillers usual in the material, an ignition-retarding adjuvant as aforesaid.

In the course of the pyrolysis of the resin based on rigid polyvinyl chloride to which it is added, the ignition-retarding adjuvant of the invention in practice plays a part in two successive stages which are a function of the temperature, and with a certain synergistic effect.

First of all, the compound capable of assisting a kinetic control of the evolution of hydrochloric acid effectively triggers a rapid loss of this acid, whilst rendering its rate of evolution uniform, which advantageously leads to the setting up of a reducing atmosphere of a nature which resists the ignition of the products which may subsequently be evolved.

A product which is satisfactory in this respect is zinc borate.

Thereafter, the catalytic combination of salts employed plays a part, in practice from 200° C. upwards, in greatly reducing the conversion to benzene and other aromatic compounds which are inherent in the progressive pyrolytic degradation of rigid polyvinyl chloride.

It furthermore makes it possible, as shown by the experiments detailed below, to orient the structure of the carbonaceous residues obtained under these conditions towards a graphite structure which is particularly advantageous because it can further retard the ignition of the material.

A composition of salts capable of proving satisfactory in this respect preferably consists of at least one oxide and at least one cyanide complex of the transition metal. For example, it can contain iron oxide, and preferably ferric oxide, and iron ferrocyanide.

Since the iron is present in such a composition at different oxidation levels, its action is advantageously staggered with temperature, the bivalent iron coming into action first, in practice from about 200° C. upwards, and the trivalent iron coming into action subsequently, in practice from about 300° C. upwards.

The experiments have shown that it is advantageous to add antimony trioxide to such iron salts, the antimony trioxide acting synergistically with the iron salts so as to produce a not insignificant boosting of the action of the latter.

In every case, and this is an important characteristic of the invention, the ignition-retarding adjuvant according to the invention is effective at use concentrations of less than 0.4% by weight of each of its components taken individually, and less than 1% (10,000 PPM) by weight in total.

In practice, with the products mentioned above or their homologues, the ignition-retarding adjuvant according to the invention is present in an amount of less than 10,000 PPM in the resin to which it is added, and each of its components is present in the said resin at a dose of between 500 and 5,000 PPM, and preferably of at most 2,000 PPM.

Such low concentrations show that the corresponding products act rather more in the capacity of a catalyst than through their intrinsic non-inflammability, in contrast to the comparable products employed when applying techniques already known in this field.

Preferably, the retardant adjuvant according to the invention also contains any additional product, such as, for example, calcium carbonate or hydrated alumina, of a type which retains a portion of hydrochloric acid in the form of a chloride; with increasing temperature, this chloride decomposes, with formation of hydrochloric acid, which overall makes it possible better to regulate the kinetics of evolution of this acid. Here again, however, such an additional product is preferably employed at a relatively low dose, of between 20,000 and 100,000 PPM and usually of less than 50,000 PPM.

The experiments show that because of the low concentration at which the ignition-retarding adjuvant according to the invention is present, resins based on rigid polyvinyl chloride treated with such an adjuvant retain their mechanical properties, and that in spite of the low concentration in which the adjuvant in question is present, the resins exhibit improved flameproof properties.

The results of the experiments are shown in Tables I and II below, the first of which relates to the results of mechanical experiments and the second to the results of experiments on the behaviour when exposed to fire.

In both cases, the experiments were carried out as a comparison between, under reference A, a resin based on a rigid polyvinyl chloride corresponding to a particular base formula suitable for the production of waste water discharge pipes, under reference B the same resin with the addition of 1,500 PPM of ferrocene as an ignition-retarding adjuvant and, under reference C, the same resin with the addition of the ignition-retarding adjuvant according to the invention.

For this ignition-retarding adjuvant, the formulation (I) employed was as follows:

| | | |
|---|---|---|
| zinc borate: | 2,000 | PPM |
| iron ferrocyanide: | 1,000 | " |
| ferric oxide: | 1,000 | " |
| antimony trioxide: | 1,000 | " |
| calcium carbonate: | 40,000 | " |

It will be noted that in such an ignition-retarding adjuvant the iron ferrocyanide, the ferric oxide and the antimony trioxide are each present in equal amounts and that the zinc borate is present in an amount twice that of each of the preceding compounds. It will also be noted that the amounts amployed of the products in question correspond approximately to 5% by weight of zinc borate, 2.5% by weight of iron ferrocyanide, ferric oxide and antimony trioxide, and 87.5% by weight of calcium carbonate, zinc borate comprising about 50% of the total weight of zinc borate, iron ferrocyanide and ferric oxide, and the iron ferrocyanide and ferric oxide each comprising about 25% of the total weight.

The results of the mechanical experiments were as follows:

TABLE I

| Nature of the experiment | Result of the experiment | | |
|---|---|---|---|
| | Resin A | Resin B | Resin C |
| Tensile strength, megapascals | 52 to 54 | 52 to 54 | 52 to 54 |
| Elongation at break, % | 120 | 80 | 120 |
| Vicat, °C. | 82 | 82 | 82 |
| Heat conductivity | 3 | 3 to 4 | 3 |
| Dielectric constant at $10^3$ c/s | 3 | 3 | 3 |
| Tangent $\delta$ | $20 \times 10^{-3}$ | $18 \times 10^{-2}$ | $20 \times 10^{-2}$ |
| Z factor after 255 hours exposure to U.V. rays | $16.75 \rightarrow 17.38$ | $15.82 \rightarrow 1.88$ | $12.02 \rightarrow 12.90$ |

In Table I, the factor Z is the image of the blackening and is inversely proportional to such blackening; this follows from experiments on the "Weather-O-meter." It will be noted that the resin treated with ferrocene is subject to very great blackening, whilst such is not the case for the resin to which the ignition-retarding adjuvant according to the invention has been added, the change of which towards black is of the same order of magnitude as that affecting the resin corresponding to the reference base formulation alone.

It will be noted that in the case of the resin treated with ferrocene the elongation at break is substantially reduced, while this is not the case for the resin treated according to the invention.

The experiments on behaviour when exposed to fire were carried out with the aid of the so-called epi-radiator apparatus described in French Standard Specification NF 92,507, as well as with the aid of the apparatus suitable for measuring the oxygen index described in Standard Specification ASTM D 2,863.

The results of the experiments carried out are shown in Table II which follows:

TABLE II

| Nature of the experiment | Results of the experiment | | |
|---|---|---|---|
| | Resin A | Resin B | Resin C |
| Epi-radiator | 1st flame at 3 minutes, goes out | 1st flame at 10 minutes, goes out | No flame |
| | 2nd flame at 7 minutes, height | No 2nd flame | |

TABLE II-continued

| Nature of the experiment | Results of the experiment | | |
|---|---|---|---|
| | Resin A | Resin B | Resin C |
| | of flame less than 20 | | |
| Oxygen index | 48 | 62 | 57 |
| Opacity of fumes 450° C. | 11.2 | 9.2 | 8.9 |
| Log index 650° C. | 7.6 | 4.5 | 4.2 |

This Table II shows the remarkable flameproof properties of a resin treated according to the invention, with which resin no flame whatsoever appeared in the epiradiator test.

It has also been possible to show that while for resins having a relatively low oxygen index, there is a parallelism between this index and the appearance of the flame, such is not the case for resins of relatively high oxygen index. In fact, while both the resin treated with ferrocene and the resin treated according to the invention have high oxygen indices, a flame nevertheless appears in the case of the first of these resins, which has the highest oxygen index, whilst this is no longer the case for the second of these, which has the lowest oxygen index.

Table III gives other examples embodying the invention with the corresponding test results, relative to resin C which differs as to the fomulation of the ignition-retarding adjuvant used.

The amounts indicated are expressed in parts per million (PPM) of resin, obviously calcium carbonate may be added, as above, to the enumerated constituents.

TABLE III

| | Composition of the ignition-retarding adjuvant | | | | Results of experiment | | |
|---|---|---|---|---|---|---|---|
| Formulation | zinc borate | iron ferrocyanide | ferric oxide | antimony trioxide | epi-radiator | oxygen index | opacity of fumes |
| II | 2,000 | 1,000 | 1,000 | 10,000 | no flame | 63 | 10 |
| III | 2,000 | 5,000 | 5,000 | 1,000 | no flame | 57 | 9 |
| IV | 2,000 | 1,000 | 1,000 | 2,500 | no flame | 60 | 9 |

It emerges from this Table that the formulation II is better than formulation I in respect to the oxygen index, but it is not as good in respect to fume opacity.

It also emerges from Table III that increasing the iron ferrocyanide and ferric oxide contents, formulation III, does not substantially alter the results, thereby confirming the catalytic action of these salts.

As to formulation IV it produces results in between those of formulations I and II.

Similar results to those of formulation III have been obtained with formulation V in which the 2000 PPM of the zinc borate in formulation III were replaced with 2000 PPM of zinc oxide.

In the foregoing examples of the invention, the metal salts of the catalytic composition adapted to reduce benzene and other aromatic compound transformations are iron salts.

When the rigid polyvinyl chloride to be treated is of cellular structure, that is, when expansion agents are employed for reducing the density, for example, to reduce the density from about 1.4 g/m3 to about 0.85 g/m3 according to the procedure set forth in French printed patent application Nos. 2,130,735 and 2,139,625 such iron salts are not suitable, because they have a tendency to react with the products of decomposition of the expansion agents and thereby lose their effectiveness.

According to the invention since the compound which makes it possible to better regulate the kinetics of evolution of hydrochloric acid which is once again zinc borate, the catalytic composition of the metal salts used preferably comprises a combination copper thiocyanate and antimony oxide.

These salts act synergistically. In fact experiments demonstrate that used separately on cellular rigid polyvinyl chloride they are practically ineffective. On the contrary, used together, according to the invention, they sufficiently improve the fireproof properties of the polyvinyl chlorides treated to change substantially their classification according to standards operative in various countries.

The composition of an ignition retarding-adjuvant which gives satisfaction in this respect is as follows:

| zinc borate | 2000 PPM |
|---|---|
| copper thiocyanate | 2000 PPM |
| antimony oxide | 5000 PPM |

This composition may vary in the following ranges:

| zinc borate | 100 to 200 PPM |
|---|---|
| copper thiocyanate | 100 to 5000 PPM |
| antimony oxide | 100 to 10000 PPM |

In both cases the indicated values are in parts per million of the polyvinyl chloride to which expansion agents have been added.

Of course, the present invention is not restricted to the embodiments concisely described above, but encompasses any variant. In particular, in the case where only ferric oxide and iron ferrocyanide are employed in the catalytic composition of salts, antimony trioxide being omitted, each of the components of this composition can be present in the treated resin at an increased dose, which can, for example, reach 5,000 PPM.

Furthermore, other metals than iron can be used for such a composition, and in particular any of the so-called heavy metals or transition metals which belong to sub-groups VI to VIII of the periodic classification of the elements.

In all cases, and taking into account the low concentration at which it is used, the ignition-retarding adjuvant according to the invention does not significantly increase the cost of the resin to which it is added and can even permit certain economies in respect of the stabilisers also usually added to such a resin.

Furthermore, if the cyanide complex employed, such as the ferrocyanide, leads to a particular coloration of this resin, it is possible, in order to revert to the desired shade, to add a different colorant appropriate to this resin, and the corresponding amounts added remain low and hence inexpensive.

What I claim is:

1. Polyvinyl chloride suitable for use as a moldable resin containing an ignition-retarding adjuvant comprising a zinc compound selected from the group consisting of zinc borate and zinc oxide in an amount ranging from 100 to 2000 parts per million by weight of polyvinyl chloride, a cyano catalytic composition selected from the group consisting of a cyanide complex and a cyanate complex of a transition metal in an amount ranging from 1000 to 5000 parts per million by weight of polyvinyl chloride, and an oxide selected from the group consisting of antimony oxide and ferric oxide in an amount ranging from 1000 to 10000 parts per million by weight of polyvinyl chloride in the case of antimony oxide and in an amount ranging from 1000 to 2000 parts per million by weight of polyvinyl chloride in the case of ferric oxide.

2. Polyvinyl chloride according to claim 1 further including a member of the group consisting of calcium carbonate and hydrated alumina in an amount ranging from 20000 to 10000 parts per million.

3. Polyvinyl chloride according to claim 1, wherein said cyano catalytic composition includes iron ferrocyanide and copper thiocyanate.

4. Polyvinyl chloride according to claim 1, wherein said adjuvant comprises by weight about 5% of zinc borate, about 2.5% iron ferrocyanide, about 2.5% of ferric oxide, about 2.5% antimony trioxide, and about 87.5% of calcium carbonate.

5. Polyvinyl chloride according to claim 1, wherein the ignition-retarding adjuvant has the composition
zinc borate: 100 to 2000 parts per million
copper thiocyanate: 1000 to 5000 parts per million
antimony oxide: 1000 to 10000 parts per million.

6. Polyvinyl chloride according to claim 1, wherein the ignition-retarding adjuvant has the composition about 2000 parts per million zinc borate, about 2000 parts per million copper thiocyanate, and about 5000 parts per million antimony oxide.

7. Polyvinyl chloride according to claim 1, in which the said ignition-retarding adjuvant is present in an amount of less than 10,000 parts per million.

8. Polyvinyl chloride according to claim 1, in which each component of the said adjuvant is present in the said polyvinyl chloride in an amount of between 500 and 2,000 parts per million.

9. Polyvinyl chloride according to claim 1, in which the ignition-retarding adjuvant contains antimony oxide, iron oxide and iron ferrocyanide and each component of the said adjuvant is present in the said polyvinyl chloride in an amount of between 500 and 2,000 parts per million.

10. Polyvinyl chloride according to claim 1, in which the ignition-retarding adjuvant comprises zinc borate, iron ferrocyanide, ferric oxide, antimony trioxide and calcium carbonate in a weight ratio of 2:1:1:1:35 respectively and the calcium carbonate is present in the said polyvinyl chloride in an amount of between 20,000 and 100,000 parts per million.

11. Polyvinyl chloride according to claim 1, in which the components of the ignition-retarding adjuvant are zinc borate 2,000 parts per million, iron ferrocyanide 1,000 parts per million, ferric oxide 1,000 parts per million, antimony trioxide 1,000 parts per million, and calcium carbonate or hydrated alumina 40,000 parts per million.